United States Patent
Reece et al.

(10) Patent No.: US 11,304,357 B2
(45) Date of Patent: Apr. 19, 2022

(54) SEED COATING COMPOSITION

(71) Applicant: Incotec Holding B.V., Enkhuizen (NL)

(72) Inventors: Tyler Alan Reece, Johnston, IA (US); Ryan Thomas Latham, Salinas, CA (US); Gerard Henry Denny, Salinas, CA (US)

(73) Assignee: INCOTEC HOLDING B.V., Enkhuizen (NL)

( * ) Notice: Subject to any disclaimer, the term of this patent is extended or adjusted under 35 U.S.C. 154(b) by 112 days.

(21) Appl. No.: 16/463,038

(22) PCT Filed: Nov. 17, 2017

(86) PCT No.: PCT/IB2017/001536
§ 371 (c)(1),
(2) Date: May 22, 2019

(87) PCT Pub. No.: WO2018/096394
PCT Pub. Date: May 31, 2018

(65) Prior Publication Data
US 2019/0307056 A1 Oct. 10, 2019

Related U.S. Application Data

(60) Provisional application No. 62/425,870, filed on Nov. 23, 2016.

(51) Int. Cl.
| | |
|---|---|
| *A01C 1/06* | (2006.01) |
| *C09D 139/06* | (2006.01) |
| *C08L 39/06* | (2006.01) |
| *C08L 29/04* | (2006.01) |
| *C08K 3/34* | (2006.01) |
| *C08K 7/02* | (2006.01) |
| *C08L 1/02* | (2006.01) |
| *C08K 3/013* | (2018.01) |
| *A01N 25/00* | (2006.01) |
| *A01N 25/26* | (2006.01) |

(52) U.S. Cl.
CPC ............. *A01C 1/06* (2013.01); *A01N 25/00* (2013.01); *A01N 25/26* (2013.01); *C08K 3/013* (2018.01); *C08K 3/34* (2013.01); *C08K 7/02* (2013.01); *C08L 1/02* (2013.01); *C08L 29/04* (2013.01); *C08L 39/06* (2013.01); *C09D 139/06* (2013.01)

(58) Field of Classification Search
CPC .......... A01C 1/06; A01N 25/26; C08K 3/013; C08K 7/02; C08L 1/02; C08L 29/04; C08L 39/06; C09D 139/06
See application file for complete search history.

(56) References Cited

U.S. PATENT DOCUMENTS

| | | | |
|---|---|---|---|
| 6,329,319 B1 | 12/2001 | Puglisi et al. | |
| 2009/0093365 A1* | 4/2009 | Walsh | A01N 25/26 504/100 |
| 2012/0220454 A1 | 8/2012 | Chen et al. | |
| 2013/0053244 A1* | 2/2013 | Devisetty | A01N 43/90 504/136 |

FOREIGN PATENT DOCUMENTS

| | | | |
|---|---|---|---|
| CA | 1120748 A | 3/1982 | |
| CN | 1291432 A | 4/2001 | |
| CN | 1384736 A | 12/2002 | |
| CN | 103391710 A | 11/2013 | |
| CN | 104893463 A | 9/2015 | |
| EP | 1078563 A1 | 2/2001 | |
| GB | 690814 | 4/1953 | |
| WO | 0035277 A1 | 6/2000 | |
| WO | WO 00/35277 * | 6/2000 | ............. A01N 25/10 |
| WO | 0132150 A1 | 5/2001 | |
| WO | 03003812 A1 | 1/2003 | |
| WO | 2007053097 A1 | 5/2007 | |
| WO | 2012076055 A1 | 6/2012 | |
| WO | 2014090988 A1 | 6/2014 | |
| WO | 2015003624 A1 | 1/2015 | |
| WO | 2016060230 A1 | 4/2016 | |

OTHER PUBLICATIONS

Zhou et al. (Composites Part B 76 (2015) 180-191). (Year: 2015).*
Pharam Family (Arbocel Powdered Cellulose Oct. 24, 2016 https://www.jrspharma.com/pharma_en/products-services/excipients/fillers/functional-fillers-arbocel.php (Year: 2016).*
Agrimer VA (Ashland; product monograph vinyl pyrrolidone/vinyl acetate copolymers 2020) (Year: 2020).*
International Preliminary Report on Patentability for International Application No. PGT/IB2017/001536, dated May 28, 2019, 4 pages.
International Search Report and Written Opinion for International Application No. PCT/IB2017/001536, dated April 5, 2018—10 pages.
Chinese Office Action for Chinese Application No. 201780080947.X, dated Feb. 3, 2021, with partial English translation, 10 pages.
Japanese Notice of Reasons for Refusal for Japanese Application No. 2019-527421, dated Jun. 4, 2021 with translation, 7 pages.

* cited by examiner

*Primary Examiner* — Anna R Falkowitz
(74) *Attorney, Agent, or Firm* — RatnerPrestia

(57) ABSTRACT

The invention is directed to a seed coating composition containing a polymeric binder, a filler and a fibrous material. The seed coating composition can be formed by combining an aqueous composition pre-blend which contains a polymeric binder with a powder pre-blend which contains a filler and a fibrous material. The polymeric binder preferably contains polyvinylpyrrolidone, the filler preferably contains talc and the fibrous material preferably contains cellulose fibers.

4 Claims, No Drawings

SEED COATING COMPOSITION

CROSS-REFERENCE TO RELATED APPLICATIONS

This application is a National Phase Patent Application of PCT/IB2017/001536, filed Nov. 17, 2017, which claims priority under 35 U.S.C. § 119(e) to U.S. Provisional Patent Application No. 62/425,870, filed Nov. 23, 2016, which application is hereby incorporated herein by reference in its entirety.

The invention is directed to a seed coating composition, to a method of forming a seed coating composition and coating on to seed, and to a coated seed.

Plant seed is often coated before sowing, for example, to protect seeds from damage during handling and/or to improve handling properties. Seeds are often coated to provide useful substances (active ingredients) to the seed and the seedlings upon germination, for example, plant nutrients, growth stimulating agents, and plant protective products. An important advantage of providing active ingredients in a seed coating is that it allows for a precise and controlled release and dose per seedling.

Advantages of coating seed can include increased size, increased chemical loading capacity, abrasion resistance, smooth surface, low dust, high plantability and good durability. There is a need for a seed coating composition to provide improved aforementioned properties and have a reduced drying requirement.

Typical seed coating methods include film coating, pelleting and encrusting of seed.

We have surprisingly discovered a seed coating composition which overcomes or significantly reduces at least one of the aforementioned problems.

Accordingly, in a first aspect the invention is directed to a seed coating composition comprising a polymeric binder, a filler and a fibrous material.

In a second aspect, the invention is directed to a method of forming a seed coating composition which comprises combining an aqueous composition pre-blend comprising a polymeric binder and a powder pre-blend comprising a filler and a fibrous material.

In a third aspect, the invention is directed to a method of coating seed which comprises applying a seed coating composition comprising a polymeric binder, a filler and a fibrous material, to seed.

In a fourth aspect, the invention is directed to seed with a coating comprising a polymeric binder, a filler and a fibrous material.

In a fifth aspect, the invention is directed to the use of cellulose fibers in a seed coating composition to reduce the drying time required when the composition is coated onto seed.

The seed coating compositions of the invention are surprisingly able to provide a wide range of desirable seed coating properties such as water-permeability, good abrasion resistance, low dust emissions, short drying time, good flow ability and plant ability, low clumping, good cosmetics and/or coverage, higher capacity for adding increased numbers of desirable nutrients and seed and plant protectants, and/or increased seed size for plantability.

The term "seed" as used in this application is meant to refer in particular to the ripened ovule of gymnosperms and angiosperms, which contain an embryo surrounded by a protective cover. In particular, the term covers cereal kernels. The protective cover can comprise the seed coat (testa). Some seeds comprise a pericarp or fruit coat around the seed coat. In particular, when this layer is closely adhered to the seed, as in cereal kernels, it is in some cases referred to as a caryopsis or an achene. As used in this application, the term "seed coat" is meant to include a caryopsis or an achene. The term "seed" includes anything that can be planted in agriculture to produce plants, including pelleted seeds, true seeds, plant seedlings, rootstock, regenerable and plant forming tissue, and tubers or bulbs.

The term "coating" as used in this application, is meant to refer to applying material to a surface of a seed, for instance as a layer of a material around a seed. Coating includes film coating, pelleting, and encrusting or a combination of these techniques as known in the art. Pellets obtained with pelleting are also known as seed pills. Encrusting is particularly preferred. The coating is preferably applied over substantially the entire surface of the seed, such as over 90% or more of the surface area of the seed, to form a layer. However, the coating may be complete or partial, for instance over 20% or more of the surface area of the seed, or 50% or more.

The term "seed coating composition" as used in this application is meant to refer to a composition to be used for coating of seed.

The term "different location" as used in this application is meant in different mixing vessels, preferably in different buildings or premises, more preferably at least 5 miles apart. Thus, in one embodiment, the aqueous composition pre-blend and powder pre-blend, as defined herein, are prepared separately by mixing their relevant individual components, and then packaged, stored and/or transported and are only thereafter combined together, with other optional components, e.g. biologically active ingredients, at a different location to form the seed coating composition.

The term "plant enhancing agent" as used in this application is meant to refer to any component that is directly or indirectly advantageous for a plant or a plant seed, for instance through a biological effect on the plant, seed, or on organisms harmful for a plant such as fungi, pests and insects. Plant enhancing agents include plant protective products, safeners, growth promoters, growth regulators, nutrients, and the like.

The seed is a plant seed, for example a seed of an agricultural or field crop, a vegetable seed, a herb seed, a wildflower seed, an ornamental seed, a grass seed, a tree seed, or a bush seed.

Preferably, the plant seed is of an agricultural crop. The seed may be of the order of Monocotyledoneae or of the order of Dicotyledoneae. Suitable seeds include seed of soybean, cotton, corn, peanut, maize, wheat, barley, oat, rye triticale, mustard, oil seed rape (or canola) sunflower, sugar beet, safflower, millet, chicory, flax, rapeseed, buckwheat, tobacco, hemp seed, alfalfa, signal grass, clover, sorghum, chick pea, beans, peas, vetch, rice, sugar cane, guayule, and linseed. Examples of suitable vegetable seeds include asparagus, chives, celery, leek, garlic, beetroot, spinach, beet, curly kale, cauliflower, sprouting broccoli, savoy cabbage, white cabbage, red cabbage, kohlrabi, Chinese cabbage, turnip, endive, chicory, water melon, melon, cucumber, gherkin, marrow, parsley, fennel, pea, beans, radish, black salsify, eggplant, sweet corn, pop-corn, carrot, onion, tomato, pepper, lettuce, snap bean, cucurbit, shallot, broccoli, *Brassica*, and Brussels sprout.

Preferably, the plant seed is selected from the group consisting of corn, soybean and rice, and particularly is corn.

Preferably, the plant seed is capable of germinating. Optionally, the seed may be deprived of husk (so-called husked seed or de-hulled seed). The seed may be primed or not primed (having been subjected to a treatment to improve the germination rate, e.g. osmopriming, hydropriming, matrix priming).

One or more polymeric binders are present in the seed coating composition of the present invention. The at least one polymeric binder is preferably an organic polymeric binder, more preferably a synthetic polymeric binder. The polymeric binder may, for example, be selected from the group consisting of polyvinyl acetates, polyvinyl acetate copolymers, polyvinyl alcohols, polyvinyl alcohol copolymers, polyurethane, celluloses (including ethylcelluloses, methylcelluloses, hydroxymethylcelluloses, hydroxypropylcelluloses, carboxymethylcelluloses, and hydroxymethylpropyl celluloses), polyvinylpyrrolidones, dextrins, maltodextrins, starchs, polysaccharides, fats, oils, proteins, gum arabics, shellacs, vinylidene chloride, vinylidene chloride copolymers, calcium lignosulphonates, polyacrylates, acrylic copolymers, polyvinylacrylates, zeins, casein, gelatine, chitosan, pullulan, polyethylene oxide, polyethylene glycol, acrylamide polymers, acrylamide copolymers, polyhydroxyethyl acrylate, methylacrylamide polymers, poly(N-vinylacetamide), sodium alginate, polychloroprene and syrups. These binders may be used alone or in combination of two, or three, or more. Preferred binders can be selected from the group consisting of polyvinyl acetates, polyvinyl acetate copolymers, polyvinyl alcohols, polyvinylpyrrolidones, and polyacrylates, particularly polyvinylpyrrolidones, vinyl acetate copolymers and polyvinyl alcohols.

In one embodiment, the polymeric binder in the coating composition comprises polyvinylpyrrolidone, and suitably greater than 30%, preferably greater than 50% by weight based on the total weight of polymeric binders present is polyvinylpyrrolidone.

In one embodiment, the coating composition suitably comprises in the range from (i) 60 to 98%, preferably 70 to 95%, more preferably 80 to 92%, particularly 87 to 91%, and especially 88 to 90% by weight of polyvinylpyrrolidone, and (ii) 2 to 40%, preferably 5 to 30%, more preferably 8 to 20%, particularly 9 to 13%, and especially 10 to 12% by weight of polymeric binders other than polyvinylpyrrolidone; both based on the total weight of polymeric binders in the coating composition.

The polyvinylpyrrolidone used herein suitably has a molecular weight (weight average) in the range from 1,000 to 40,000, preferably 5,000 to 20,000, more preferably 9,000 to 11,000, particularly 9,500 to 10,500, and especially 9,800 to 10,200.

Any polymeric binders other than polyvinylpyrrolidone may be selected from the other polymeric binders described herein, and in particular from the group consisting of vinyl acetate copolymers, polyvinyl alcohols and mixtures thereof. Suitable vinyl acetate copolymers include vinyl acetate-Veova (or vinyl versatate) copolymers, ethylene-vinyl acetate copolymers, vinyl acetate-(meth)acrylic/(meth)acrylate copolymers, and particularly vinyl acetate-Veova copolymers. Veova™ is a vinyl ester (vinyl versatate) with various highly branched synthetic carboxylic acids, sold by Momentive Specialty Chemicals Inc.

In one embodiment, the polymeric binder in the coating composition comprises, consists essentially of, or consists of a mixture of polyvinylpyrrolidone, polyvinyl alcohol and vinyl acetate copolymer, preferably vinyl acetate-Veova copolymer.

The ratio of vinyl acetate copolymer, preferably vinyl acetate-Veova copolymer, to polyvinyl alcohol present in the coating composition is suitably in the range from 0.1 to 10.0:1, preferably 0.3 to 3.0:1, more preferably 0.6 to 2.0:1, particularly 1.0 to 1.2:1, and especially 1.05 to 1.15:1 by weight.

The polyvinyl alcohol suitably has a molecular weight (weight average) in the range from 2,000 to 100,000, preferably 25,000 to 60,000, more preferably 35,000 to 45,000, particularly 38,000 to 41,000, and especially 39,000 to 40,000.

The vinyl acetate copolymer, preferably vinyl acetate-Veova copolymer, suitably has a molecular weight (weight average) in the range from 2,000 to 100,000, preferably 20,000 to 70,000.

The molecular weight (weight average) of the polymeric binders described herein can be determined by techniques well known in the art such as light scattering, size exclusion HPLC or mass spectrometry, preferably by mass spectrometry.

The amount of polymeric binder in the seed coating composition is suitably in the range from 3 to 40%, preferably 6 to 25%, more preferably 8 to 12%, particularly 9.4 to 9.9%, and especially 9.6 to 9.7% by weight based on the total weight of the composition.

The filler component of the seed coating composition may be any suitable organic or inorganic material. By definition as used herein, the filler component excludes any fibrous material. A suitable organic filler material is corn starch powder. Suitable inorganic filler materials include at least one selected from the group consisting of talc, mica, kaolin, diatomaceous earth, pumice, perlite, calcium carbonate, silica, silicates, barium sulphate, titanium dioxide, and calcium sulphate, preferably talc.

The filler preferably comprises, consists essentially of, or consists of talc and/or corn starch powder, more preferably talc.

The filler is preferably in particulate form and may, for example, be irregularly shaped, spherical, approximately spherical, disc, platelet or rod shaped. The filler is preferably platy in particle shape. The filler component is non-fibrous.

The filler, preferably talc, suitably has a median particle size as determined by x-ray sedimentation using a Sedigraph III Plus Particle Size Analyzer, in the range from 0.1 to 50 µm, preferably 3 to 25 µm, more preferably 8 to 18 µm, particularly 11 to 14 µm, and especially 12 to 13 µm.

The amount of filler, preferably talc, in the seed coating composition is suitably in the range from 20 to 90%, preferably 35 to 80%, more preferably 45 to 70%, particularly 51 to 63%, and especially 55 to 59% by weight based on the total weight of the composition.

The fibrous material may comprise any suitable organic or inorganic fibers or fiber particles. The fibers may be of a natural and/or synthetic material. Suitable fibers include vegetable fibers, wood fibers, and animal fibers.

Vegetable fibers are usually of cellulose, often in combination with lignin. Suitable examples include cotton, bamboo, hemp, jute, flax, ramie, sisal, bagasse, and banana.

Wood fiber is distinguished from vegetable fiber, as being from tree sources. Forms include groundwood, lacebark, thermomechanical pulp (TMP), and bleached or unbleached kraft or sulfite pulps. Lignin is removed in the Kraft and sulfite type of pulping process.

Animal fibers are largely protein based. Examples include silkworm silk, spider silk, sinew, catgut, wool, sea silk and hair such as cashmere wool, mohair and angora, fur such as sheepskin, rabbit, mink, fox, beaver, etc.

The individual fiber particles suitably have a mean aspect ratio $d_1:d_2$ (where $d_1$ and $d_2$, respectively, are the length and width of the fiber) in the range from 3 to 50:1, preferably 5 to 25:1, more preferably 7 to 15:1, particularly 8 to 12:1, and especially 9 to 11:1. The mean length by number of the fibers is suitably in the range from 20 to 1,000 µm, preferably 50 to 500 µm, more preferably 200 to 400 µm, particularly 260 to 340 µm, and especially 280 to 320 µm. The mean width by number of the fibers is suitably in the range from 5 to 100 µm, preferably 10 to 50 µm, more preferably 20 to 40 µm, particularly 26 to 34 µm, and especially 28 to 32 µm.

The size of the fiber particles can be determined by measuring the length and width of fibers selected from a photographic image obtained by using a transmission electron microscope. At least 1,000 fiber particles could be measured to ensure statistically accurate mean values.

The fibrous material used in the present invention preferably comprises, consists essentially of, or consists of cellulose fibers. The cellulose fibers may be natural fibers or manufactured fibers (i.e. formed into a pulp and then extruded), preferably are natural fibers. The cellulose fibers may be in their natural chemical form or chemically modified, preferably are non-chemically modified.

The cellulose fibers preferably comprise, consist essentially of, or consist of, substantially non-chemically modified and/or non-chemically derivatized cellulose. Preferably, at least 95%, more preferably at least 98%, and particularly at least 99% by weight of the cellulose fibers are of non-modified and/or non-derivatized cellulose.

By cellulose will be understood to mean material comprising organic polysaccharide compounds having the repeating monomer formula $(C_6H_{10}O_5)_n$, with each glucose monomer unit linked via a glycosidic $\beta(1\rightarrow 4)$ bond to an adjacent monomer.

The cellulose fibers may be homogeneous in that they are comprised of only one specific type of cellulose, for example all having identical molecular weights. In an alternative embodiment, the cellulose fibers may be heterogeneous in that they comprise a mixture, such as a mixture having different molecular weights.

Cellulose is, of course, preferably derived from natural sources (for example, wood pulp cellulose, cotton derived cellulose, or bamboo derived cellulose), and as such the cellulose fibers so derived will comprise multiple similar constituents depending on the source. The cellulose fibers are preferably derived from wood pulp. Cellulose fibers derived from hard woods may be preferred.

The cellulose fibers used in the present invention may comprise cellulose comprising in the range from 500 to 20,000, preferably 1,000 to 15,000, more preferably 2,000 to 10,000 monomer units.

The cellulose fibers may comprise several known types of cellulose such as alpha-cellulose ($\alpha$-cellulose), beta-cellulose ($\beta$-cellulose) and gamma-cellulose ($\gamma$-cellulose).

In one embodiment, the cellulose fibers suitably comprise a high $\alpha$-cellulose content, preferably greater than 70%, more preferably greater than 80%, particularly greater than 90%, and especially greater than 98% by weight.

The carboxyl content of the cellulose fibers may be less than 5 mol. %, preferably less than 1 mol. %.

The cellulose fibers may have a low ash content, preferably lower than 1%, more preferably lower than 0.75%, and particularly lower than 0.5% by weight.

The cellulose fibers preferably have a bulk density in the range from 20 to 200 g/l, more preferably 40 to 100 g/l, and particularly 60 to 80 g/l.

Fiber particle sizes (or any other non-spherical forms) can be normalized or converted to spherical diameters of said fibers. In the form of a distribution of particle sizes, the fiber particles have a median volume particle diameter value. It will be understood that the median volume particle diameter refers to the equivalent spherical diameter corresponding to the point on the distribution which divides the population exactly into two equal halves. It is the point which corresponds to 50% of the volume of all the fiber particles, read on the cumulative distribution curve relating volume percentage to the diameter of the particles i.e. 50% of the distribution is above this value and 50% is below. This value is referred to as the "D(v,0.5)" value and is suitably determined as described herein.

Additionally, "D(v,0.9)" and "D(v,0.1)" values can also be referred to, and these values are the equivalent spherical diameter corresponding to 90% or 10% respectively of the volume of all the fiber particles, read on the cumulative distribution curve relating volume percentage to the diameter of the particles, i.e. they are the points where 10% or 90% of the distribution is above this value and 90% or 10% are below the value respectively.

The fiber particle size values, used to determine the D(v,0.5), D(v,0.1), and D(v,0.9) values, are suitably measured by techniques based on dynamic light scattering analysis, preferably using the specific method as herein described.

It has been found that the median size and/or size distributions of the fibers, preferably cellulose fibers, can be important parameters in obtaining a seed coating composition having the desired properties.

The fiber, preferably cellulose fiber, particles suitably have a D(v,0.5) value in the range from 10 to 120 µm, preferably 30 to 100 µm, more preferably 45 to 75 µm, particularly 55 to 65 µm, and especially 58 to 62 µm.

The fiber particles suitably have a D(v,0.9) value of less than 700 µm, preferably less than 500 µm, more preferably less than 400 µm, particularly less than 350 µm, and especially less than 300 µm.

Suitably, the fiber particles have a D(v,0.9) value of greater than 70 µm, more preferably greater than 150 µm, particularly greater than 230 µm, and especially in the range from 250 to 290 µm.

The fiber particles suitably have a D(v,0.1) value of less than 25 µm, more preferably, less than 20 µm, particularly less than 18 µm, and especially less than 17 µm.

Suitably the fiber particles have a D(v,0.1) value of greater than 5 µm, more preferably, greater than 8 µm, particularly greater than 12 µm, and especially in the range from 14 to 16 µm.

The ratio of the values of D(v,0.9) to D(v,0.1) represents the width of the particle size distribution, and therefore how defined the distribution is around the median particle size value. The ratio of D(v,0.9) to D(v,0.1) values for the fiber particles is preferably in the range from 5 to 40:1, more preferably 10 to 30:1, particularly 15 to 25:1, and especially 17 to 20:1.

The width of the distribution may also be represented by the difference between the D(v,0.9) and D(v,0.1) values. The difference in the D(v,0.9) and D(v,0.1) values for the fiber particles is suitably in the range from 50 to 600 µm, preferably 120 to 400 µm, more preferably 180 to 330 µm, particularly 220 to 290 µm, and especially 240 to 270 µm.

The weight average molecular weight of the fiber, preferably cellulose fiber, particles is preferably in the range from 1,000 to 10,000,000, more preferably 50,000 to 5,000,000, and especially 100,000 to 2,000,000.

The amount of fibrous material, preferably cellulose fibers, in the seed coating composition is suitably in the range from 4 to 40%, preferably 8 to 25%, more preferably 11.0 to 18.0%, particularly 13.0 to 15.5%, and especially 14.0 to 14.5% by weight based on the total weight of the composition.

Suitable cellulose fibers are commercially available, for example, from CreaFill Fibers Corp. of Chestertown, Md., USA under the CreaTech trade mark, or from J. Rettenmaier & Söhne Gmbh of Rosenberg, Germany under the Arbocel trade mark.

The ratio of filler particles, preferably talc, to fibrous material, preferably cellulose fibers, present in the seed coating composition is suitably in the range from 0.2 to 30.0:1, preferably 0.5 to 15.0:1, more preferably 2.0 to 8.0:1, particularly 3.0 to 5.0:1, and especially 3.5 to 4.5:1 by weight.

The seed coating composition may comprise one or more biologically active ingredients (including plant enhancing agents, in particular plant protective products (also referred to as PPPs)). Suitable examples of active ingredients, in particular plant enhancing agents, are fungicidal agents, bactericidal agents, insecticidal agents, nematicidal agents, molluscicidal agents, biologicals, acaricides or miticides, pesticides, and biocides. Further possible active ingredients include disinfectants, micro-organisms, rodent killers, weed killers (herbicides), attracting agents, (bird) repellent agents, plant growth regulators (such as gibberellic acid, auxin or cytokinin), nutrients (such a potassium nitrate, magnesium sulphate, iron chelate), plant hormones, minerals, plant extracts, germination stimulants, pheromones, biological preparations, etc.

The amount of active ingredient applied, of course, strongly depends on the type of active ingredient and the type of seed used. Usually, however, the amount of one or more active ingredients is in the range of 0.001 to 200 g per kg of the seed. The skilled person is able to determine suitable amounts of active ingredient depending on the active ingredient and the type of seed used. It is common practice for the skilled person to use and follow the advice of the active ingredient suppliers (e.g., BASF, Bayer, Syngenta, DuPont, etc.), such as by using technical data sheets and/or following recommendations.

Typical fungicidal agents include Captan (N-trichloromethyl)thio-4-cyclohexane-1,2-dicarboximide), Thiram tetramethylthioperoxydicarbonic diamide (commercially available as Proseed™), Metalaxyl (methyl-N-(2,6-dimethylphenyl)-N-(methoxyacetyl)-d,l-alaninate), Fludioxonil (4-(2,2-difluoro-1,3-benzodioxol-4-yl)-1-H-pyrrol-3-carbonitril; commercially available in a blend with mefonoxam as Maxim™ XL), difenoconazole (commercially available as Dividend™ 3FS), carbendazim iprodione (commercially available as Rovral™), ipconazole (commercially available as Rancona from Arista, formerly Agriphar or Chemtura), mefonoxam (commercially available as Apron™ XL), tebuconazole, carboxin, thiabendazole, azoxystrobin, prochloraz, prothioconazole (commercially available as Redigo from Bayer), sedaxane (commercially available as Vibrance from Syngenta), cymoxanil (1-(2-cyano-2-methoxyiminoacetyl)-3-ethylurea), fludioxonil, a mixture of metalaxyl, cymoxanil and fludioxonil commercially available as Wakil from Syngenta, and oxadixyl (N-(2,6-dimethylphenyl)-2-methoxy-N-(2-oxo-3-oxazolidinyl) acetamide). A fungicide can be included in the seed coating composition in an amount of 0.0001 to 10% by total weight of the coated seeds.

Typical bactericidal agents include streptomycin, penicillins, tetracyclines, ampicillin, and oxolinic acid.

Typical insecticidal agents include pyrethroids, organophosphates, caramoyloximes, pyrazoles, amidines, halogenated hydrocarbons, neonicotinoids, and carbamates and derivatives thereof. Particularly suitable classes of insecticides include organophosphates, phenylpyrazoles and pyrethoids. Preferred insecticides are those known as terbufos, chlorpyrifos, fipronil, chlorethoxyfos, tefluthrin, carbofuran, imidacloprid, and tebupirimfos. Commercially available insecticides include imidacloprid (commercially available as Gaucho™), and clothianidin (commercially available from Bayer as Poncho™), thiametoxam (commercially available from Syngenta as Cruiser™), thiacloprid (commercially available as Sonido from Bayer), Cypermetrin (commercially available from Chemtura as Langis™, methiocarb (commercially available as Mesurol from Bayer), fipronil (commercially available from BASF as Regent™), chlorantraniliprole (also known as rynaxypyr, 5-bromo-N-[4-chloro-2-methyl-6-(methylcarbamoyl)phenyl]-2-(3-chloropyridin-2-yl) pyrazole-3-carboxamide, commercially available as Coragen™ from DuPont) and cyantraniliprole (also known as cyazypyr, 3-bromo-1-(3-chloro-2-pyridyl)-4'-cyano-2'-methyl-6'-(methylcarbamoyl) pyrazole-5-carboxanilide).

Commercially available nematicidal agents include abamectin (commercially available from Syngenta as Avicta™) thiodicarb (commercially available from Bayer as Aeris™).

Typical molluscicidal agents include metaldehyde (commercially available from Lonza as Meta™) or niclosamid (commercially available from Bayer as Bayluscide™), Cyazypir and Rynaxypir (available from DuPont).

Examples of suitable biologicals include bacilli, *Trichoderma, rhizobia* (for nitrogen fixation) and the like, which have been identified as seed treatment materials to protect plants and/or enhance their health and/or productive capacity.

These lists are not exhaustive, new active ingredients are continuously developed and can be incorporated in the seed coating composition.

The seed coating composition of the present invention may also contain one or more optional pigments, which function to provide an aesthetic effect when coated on seed. The pigment is preferably an inorganic material and may, for example, be an effect pigment and/or a colored pigment as known in the art.

Examples of suitable effect pigments include pearlescent pigment in different particle sizes. Effect pigments having a particle size of 60 μm or less, or a particle size of 15 μm or less may be used. The particle size of the effect pigment is preferably not more than 200 μm, more preferably not more than 100 μm. Usually, the particle size of the effect pigment is 1 μm or more. Another effect pigment can be aluminium. Effect pigments can be used to create an attractive cosmetic look on the seeds.

Examples of colored pigments include pigment red 112 (CAS No. 6535-46-2), pigment red 2 (CAS No. 6041-94-7), pigment red 48:2 (CAS No. 7023-61-2), pigment blue 15:3 (CAS No. 147-14-8), pigment green 36 (CAS No. 14302-13-7), pigment green 7 (CAS No. 1328-53-6), pigment yellow 74 (CAS No. 6358-31-2), pigment orange 5 (CAS No. 3468-63-1), pigment violet 23 (CAS No. 6358-30-1), pigment black 7 (CAS No. 97793-37-8), and pigment white 6 (CAS No. 98084-96-9). The particle size of the colored pigment is preferably not more than 100 μm, more preferably not more than 50 μm. Usually, the particle size of the colored pigment is 25 μm or more.

A dye such as anthraquinone, triphenylmethane, phthalocyanine, derivatives thereof, and diazonium salts, may be used in addition to or as an alternative to a colored pigment.

The amount of pigment in the seed coating composition is suitably in the range from 0 to 15%, preferably 1.0 to 8.0%, more preferably 2.0 to 5.0%, particularly 2.5 to 3.5%, and especially 2.8 to 3.2% by weight based on the total weight of the composition.

One advantage of seed coating compositions of the invention is that required or improved seed coating properties can be obtained with compositions having a relatively low water content, which can result in considerably less drying being required and an increase in the efficiency of the seed coating process. The amount of water in the seed coating composition is suitably less than 30%, preferably less than 25%, more preferably less than 20%, particularly in the range from 14.0 to 17.0%, and especially 15.0 to 16.0% by weight based on the total weight of the composition.

The seed coating composition of the invention may also comprise a surface active agent such as a wetting, dispersing and/or emulsifying agent. The surface active agent may aid in mixing/emulsifying/dispersing the wax and/or pigment particles in the pre-blend and seed coating composition. Suitable surface active agents include ionic and non-ionic products and include solutions of organo-modified polyacrylates, polyacrylates, sodium polyacrylate, polyurethane, phosphoric acid ester, star polymers, and/or modified polyethers.

The seed coating composition of the invention may comprise further components such as one or more selected from a solvent, a thickener, an anti-foaming agent, a preservative, and a slip additive.

Suitable thickeners include agar, carboxy methylcellulose, carrageenan, chitin, fucoidan, ghatti, gum arabic, karaya, laminaran, locust bean gum, pectin, alginate, guar gum, xanthan gum, diutan gum, and tragacanth, bentonite clays, HEUR (hydrophobically modified, ethoxylated urethane) thickeners, HASE (hydrophobically modified, alkali-swellable emulsion) thickeners and polyacrylates. Gums are generally preferred because of their low cost, availability and superior ability to enhance the physical characteristics of the resultant coated film.

Examples of suitable antifoaming agents include polyethylene glycol, glycerine, mineral oil defoamers, silicone defoamers, and non-silicone defoamers (such as polyethers, polyacrylates), dimethylpolysiloxanes (silicone oils), arylalkyl modified polysiloxanes, polyether siloxane copolymer containing fumed silica. The antifoaming agent may be present in some embodiments of the seed coating composition in an amount of at least 1 ppm by weight, or 0.1 to 0.3% by weight based on the total weight of the seed coating composition.

A biocide can be included in some embodiments of the seed coating composition for instance as preservative, in order to prolong the shelf life of the seed coating composition before being applied to a seed, such as when being stored. Examples of suitable biocides include MIT (2-methyl-4-isothiazolin-3-one; CAS No. 2682-20-4), BIT (1,2-benzisothiazolin-3-one; CAS No. 2632-33-5)), CIT (5-Chloro-2-methyl-4-isothiazolin-3-one), Bronopol (2-Bromo-2-nitro-propane-1,3-diol) and/or a combination of these.

In an embodiment, the seed coating composition further comprises flakes of a translucent polymeric film on an inert carrier (a carrier which has no detectable, harmful consequences for the environment, in particular for the seed or the outgrowing plant in the quantities present) for providing the seeds with a light-reflecting appearance, such as described in WO-A-03/003812. Preferably, the translucent polymeric film comprises light-reflecting particles.

The seed coating composition further may comprise one or more solvents other than water. Solvents may be selected from the group consisting of alcohols, and hydrocarbons. Also mixtures of solvents can be used. It is preferred that the solvent is liquid at 20° C. and 1 atm. Examples of suitable solvents include glycols and their esters and ethers, in particular ethylene and propylene glycols and their esters and ethers, for instance, esters and ethers with $C_1$-$C_6$ alkyl groups and/or aromatic groups, such as methyl, ethyl, propyl, butyl, benzyl and phenyl ethers, including mono ethers and dialkyl ethers, and esters of these ethers, such as acetates, and ethylene and propylene glycol esters, for instance of fatty acids; polyethylene glycol (PEG) and polypropylene glycol and esters thereof, especially with fatty acids; butyl cellosolve, butyl carbitol, polyethylene glycol; N-methylpyrrolidone, glycerine, alkyl alcohols with up to 10 carbon atoms, such as ethanol, propanol and butanol. Other examples of solvents include dipropylene glycol methyl ether and propylene glycol methyl ether. An important solvent is ethylene glycol. Further examples include propylene tetramer and synthetic ester oils such as lactate esters, particularly ethyl lactate and benzoate esters e.g. iso-propyl or 2-ethylhexyl benzoates. Aromatic hydrocarbons such as xylene, aliphatic and paraffinic solvents and vegetable oils can also be used as solvent. Aromatic solvents are less preferred.

The seed coating composition may also comprise components with a plasticising effect, such as surfactants or antifreeze agents. Common surfactants include amphiphilic organic compounds, usually comprising a branched, linear or aromatic hydrocarbon, fluorocarbon or siloxane chain as tail and a hydrophilic group. Some types of surfactants include non-ionic, anionic, cationic and amphoteric surfactants, and organosilicone and organofluorine surfactants. Some examples of surfactants include polyoxyethylene glycol and polyoxypropylene ethers and esters, in particular alkyl, aryl and alkylaryl ethers thereof, and sulphates, phosphates and sulphonic acid compounds of such ethers, glucoside (alkyl) ethers, glycerol esters, such as alkyl and fatty acid esters, sorbitan (alkyl) esters, acetylene compounds, cocamide compounds, block copolymers of polyethylene glycol and propylene glycol. Further examples of surfactants include alkylamine salts and alkyl quaternary ammonium salts, for example betaine type surfactants, amino acid type surfactants; and polyhedric alcohols, fatty acid esters, in particular $C_{12}$-$C_{18}$ fatty acids, for instance of polyglycerin, pentaerythritol, sorbitol, sorbitan, and sucrose, polyhydric alcohol alkyl ethers, fatty acid alkanol amides, and propoxylated and ethoxylated compounds such as fatty alcohol ethoxylates, polyethyxlated tallow amine and alkylphenol ethoxylates. Some examples of anionic surfactants include carboxylic acids, copolymers of carboxylic acids, sulphates, sulphonic acid compounds and phosphates, for example lignin sulphonates and (linear) alkylaryl sulphonates.

Anti-freeze agents include for example: ethylene glycol, propylene glycol, 1,3-butylene glycol, hexylene glycol, diethylene glycol, and glycerin, with the preferred glycol being ethylene glycol and propylene glycol.

In one embodiment, a powder formulation or pre-blend and aqueous composition pre-blend are formed separately and then mixed together to form the seed coating composition of the invention. The powder pre-blend and aqueous composition pre-blend may be formed in a different location to where the seed coating composition is formed, and preferably kept separate until the time of application of the seed coating composition to the seed, to form the coated seed. The seed coating composition is suitably formed by combining the powder pre-blend, aqueous composition pre-blend and any other optional components, e.g. biologically active ingredients; and simultaneously or shortly thereafter, e.g. within 5 hours, preferably within 30 minutes, applying to the seed. The seed coating process can range from a few seconds, e.g. from 15 seconds, to a few hours, e.g. up to 8 hours, depending on the type of seed, seed coating composition, build up level required and other variables. The powder pre-blend, aqueous composition pre-blend and other components are preferably added simultaneously to the seed, for at least part of the time, during the seed coating process.

The powder pre-blend is suitably a substantially anhydrous free flowing solid material which comprises, consists essentially of, or consists of, the filler and fibrous material, defined herein.

The aqueous composition pre-blend preferably comprises the polymeric binder defined herein. The aqueous composition pre-blend may also comprise pigment, as defined herein, and any of the other optional seed coating composition components defined herein. The aqueous composition pre-blend may also contain one or more of the biologically active materials described herein. In addition, or alternatively, one or more biologically active materials may be added separately when the powder pre-blend and aqueous composition pre-blend are mixed together to form the seed coating composition of the present invention.

The aqueous composition pre-blend suitably comprises in the range from (i) 5 to 70%, preferably 15 to 60%, more preferably 22 to 50%, particularly 27 to 40%, and especially 32 to 35% by weight of polymeric binder based, on the total weight of the composition; (ii) 0 to 40%, preferably 2 to 25%, more preferably 5 to 15%, particularly 9 to 12%, and especially 10 to 11% by weight of pigment, based on the total weight of the composition; and/or (iii) 20 to 75%, preferably 35 to 70%, more preferably 45 to 65%, particularly 50 to 60%, and especially 54 to 57% by weight of water, based on the total weight of the composition.

The powder pre-blend comprises, consists essentially of, or consists of, in the range from (i) 30 to 99%, preferably 50 to 95%, more preferably 70 to 90%, particularly 75 to 85%, and especially 78 to 82% by weight of filler, based on the total weight of the composition; and/or (ii) 1 to 70%, preferably 5 to 50%, more preferably 10 to 30%, particularly 15 to 25%, and especially 18 to 22% by weight of fiber particles, based on the total weight of the composition.

The ratio of filler particles, preferably talc, to fibrous material, preferably cellulose fibers, in the powder pre-blend is suitably in the range from 0.5 to 15.0:1, preferably 2.0 to 8.0:1, more preferably 3.0 to 5.0:1, particularly 3.5 to 4.5:1, and especially 4.0:1 by weight.

In one embodiment, the seed coating composition according to the invention is formed by combining or mixing together components comprising, consisting essentially of, or consisting of, (i) the aqueous composition pre-blend defined herein, and (ii) the powder pre-blend defined herein, suitably at a ratio in the range from 0.05 to 3.0:1, preferably 0.10 to 1.0:1, more preferably 0.25 to 0.60:1, particularly 0.35 to 0.45:1, and especially 0.40:1 by weight, and optionally (iii) one or more biologically active ingredients defined herein.

The amount of one or more active ingredients in the seed coating composition is suitably in the range from 0 to 5.0%, preferably 0.1 to 2.5%, more preferably 0.2 to 1.0%, particularly 0.3 to 0.8%, and especially 0.4 to 0.6% by weight based on the total weight of the composition.

In one embodiment, the seed is not provided with artificial layers prior to applying the seed coating composition of the invention, for example primer layers comprising a binder, such as a polymer. Accordingly, the seed coating composition is preferably applied directly on the natural outer surface of the seed. Nonetheless, it is possible that the seed surface has undergone a surface treatment prior to applying the seed coating composition. It is possible that such surface treatment does not entail the provision of an artificial layer, but involves a physical change or modification of the surface of part of the seed or the entire surface of the seed. For example, the surface treatment may involve increasing the surface roughness of the seed, such as by selective removal of parts of the seed coat, selective deformation of the seed coat, or a combination thereof. Typically, the treatment may involve introducing micro roughness on the seed surface. It is also possible that the seed surface is subjected to a surface treatment that does involve the provision of an artificial layer, such as the application of a primer coating layer on the seed surface. Other suitable surface treatments include, e.g. plasma surface treatment, contacting the seed with an abrasive material, exposure to hot and humid air, flame treatment, laser treatment, and electron beam surface treatment.

Preferably, the seed coating composition is applied as a liquid composition and/or emulsion and/or dispersion and/or latex composition and thereafter solidified (including cured and/or dried) to form a seed coating. The term "liquid coating composition" as used in this application is meant to include coating compositions in the form of a suspension, emulsion, and/or dispersion, preferably a dispersion.

Conventional means of coating may be employed for coating the seeds. Various coating machines are available to the person skilled in the art. Some well-known techniques include the use of drum coaters, fluidised bed techniques, rotary coaters (with and without integrated drying), and spouted beds. Suitably, the seed coating composition is applied to the seed by a rotary coater, a rotary dry coater, a pan coater or a continuous treater.

Typically, the amount of seed coating composition applied to the seed can be in the range of 10 to 1,000 g dry wt. per kg seed, such as 30 to 650 g dry wt. per kg seed, 100 to 400 g dry wt. per kg seed, or 150 to 250 g dry wt. per kg seed. The seed coating composition can, for instance, be applied by encrusting, film coating, spraying, dipping, or brushing of the seed coating composition. Optionally, it is applied at a temperature of 2 to 50° C., for instance 5 to 35° C., more often 15 to 30° C., for instance at room temperature, such as 18 to 25° C. Preferably, the seed coating composition is applied to the seed by encrusting. The seed coating may suitably be applied by spraying the liquid aqueous composition pre-blend onto the seed, while also applying the powder pre-blend, typically while the seeds move within a coating apparatus. Preferably, the method comprises applying the seed coating composition to form an encrustment layer.

The seed coating composition is suitably applied to the seed such that the ratio of the dried coating layer to seed is suitably in the range from 0.001 to 20:1, preferably 0.05 to 10:1, more preferably 0.01 to 1.0:1, particularly 0.05 to 0.5:1, and especially 0.1 to 0.2:1 by weight.

An additional film coat layer may optionally be applied over the top of the coating, preferably encrustment, layer of the invention to provide additional benefits, including but not limited to cosmetics, coverage, actives, nutrients, and processing improvements such as faster drying, seed flow, durability and the like.

The following test method was used; —particle size values, used to determine the D(v,0.5), D(v,0.1), and D(v, 0.9) values of the fibrous material herein, were determined by dynamic light scattering analysis by using a Malvern Mastersizer 2000 with a Hydro 2000SM attachment running on water set at 2,100 rpm. The refractive index of the material was set as 1.53 with an absorbance of 0.1. 12,000 snaps were taken over 12 seconds to obtain the data. An average of three runs was used to determine the final particle size. From the particle size values obtained, D(v,0.5), D(v, 0.1), and D(v,0.9) values were readily determined.

The invention is illustrated by the following non-limiting examples.

EXAMPLE 1

Pre-blend formulations were prepared according to Table 1.

TABLE 1

Aqueous Composition Pre-Blend and Powder Pre-Blend Formulations

| Aqueous Composition Pre-Blend (wt. %) | |
|---|---|
| water | 43.12 |
| rheology additive | 0.2 |
| defoamer | 0.04 |
| biocide | 0.19 |
| polyvinylpyrrolidone | 30.0 |
| polyvinyl alcohol (15 wt. %) | 12.0 |
| vinyl acetate-Veova copolymer (50 wt. %) | 4.0 |
| colored pigment | 5.45 |
| mica | 5.0 |
| Powder Pre-Blend (wt. %) | |
| cellulose fiber | 20.0 |
| talc | 80.0 |

A PPP (plant protection products) cocktail was used containing 20.77% Cruiser 5FS (insecticide, ex Syngenta) and 6.0% Maxim Quattro (fungicide, ex Syngenta). Corn seeds were coated with a mixture of 0.7 wt. % PPP cocktail, 30.5 wt. % aqueous composition pre-blend and 68.8 wt. % powder pre-blend; the application rate being such that 200 g dry film coating per kg seed was applied. The coated seeds were dried in warm air for 10 minutes.

EXAMPLE 2

The rate of drying of the seeds produced in Example 1 was measured by using a cotton indicator. The coated seeds, after exiting the coater, were collected in a flat tray and a timer was activated. The drying was checked every 10 seconds by placing a fresh cotton indicator at a new seeds' surface in the seed tray each time. The moment there was no sign of color transfer on the cotton indicator from the seed, the timer was stopped and the time was recorded Clumping/bridging of seeds takes place when wet seeds exiting out of the coater are collected in the storage hopper and compacted by oncoming seeds. This presents a challenge to the seed treatment facility in terms of equipment blocking, labor and time.

There was no color transfer on the cotton indicator after 10 seconds, the coated corn seeds were immediately dry to the touch, non-tacky and showed no clumping.

EXAMPLE 3

100 g of the coated corn seeds produced in Example 1 were submitted to a 4-minute Heubach test in duplicate, and the results averaged to a total amount of dust-off per 100,000 seeds. In the case of corn, the dust reference values that were developed by ESA for treated corn seeds is a maximum of 0.75 g of dust per 100,000 seeds. Dust level was reduced to 0.12 to 0.14 g per 100,000 seeds when using the coated corn seeds of Example 1. Abrasion on the corn seeds was visually observed after the dust experiment in the Heubach apparatus. The abrasion score is a visual quantification of the quality of seeds after subjecting them to 4 minutes in the Heubach apparatus closely simulating handling conditions in the industry. The abrasion score was allocated from 1 (high abrasion resistance/good quality seeds) to 5 (low abrasion resistance/poor quality seeds). The coated corn seeds had an abrasion score of 1.

EXAMPLE 4

The flow of coated seeds is important at the seed treating facility as well as at the farm whilst going through the planter. The lower the friction between the seeds, the better the efficiency at various stages. Typically, the addition of PPPs and traditional film-coats to corn seeds slows down the flow of seeds considerably, which is not a desired characteristic. For testing the flow of the coated corn seeds produced in Example 1, 1 kg of seeds were placed in a funnel fitted with a stopper. The stopper was opened and timer started simultaneously. The time taken for the last seed to exit the funnel was recorded as the flow rate in (s/kg). The coated corn seeds had a flow rate of 6.39 s/kg, compared to uncoated corn seeds which had a flow rate of 6.18 s/kg, i.e. the coated corn seeds allowed flow almost as fast as untreated corn seeds.

The above examples illustrate the improved properties of the seed coating composition and coated seeds according to the present invention.

The invention claimed is:
1. A seed coating composition comprising:
   a range from greater or equal to 70 to less than 95% by weight of polyvinylpyrrolidone, where the polyvinylpyrrolidone has a molecular weight in a range of 9,000-11,000;
   a range from greater or equal to 5 to less than 30% by weight of a polymeric binder other than polyvinylpyrrolidone;
   a filler comprising talc; and
   a fibrous material comprising cellulose fibers having a median volume particle diameter value D(v,0.5) in a range 10-120 μm.
2. The seed coating composition according to claim 1 wherein the polymeric binder other than polyvinylpyrrolidione comprises at least one polymer selected from the group consisting of polyvinyl acetate, vinyl acetate copolymer, polyvinyl alcohol and polyacrylate.
3. The seed coating composition according to claim 1 comprising less than 20% by weight of water.
4. The seed coating composition according to claim 1, wherein the filler is in particle form and wherein the ratio of filler particles to fibrous material is 0.5 to 15.0:1 by weight.

* * * * *